United States Patent [19]
Hsh

[11] Patent Number: 5,894,514
[45] Date of Patent: Apr. 13, 1999

[54] POSITIONING STRUCTURE OF THE UPPER COVER OF A TELEPHONE RECEIVER

[76] Inventor: Run-Chi Hsh, 3F, No. 5, Alley 5 La. 25 Min-Teh Rd., Chung-Ho City, Taipei Hsien, Taiwan

[21] Appl. No.: 08/917,881
[22] Filed: Aug. 27, 1997
[51] Int. Cl.⁶ .................................................. H04M 1/00
[52] U.S. Cl. ............................................ 379/437; 379/451
[58] Field of Search .................................. 379/437, 451, 379/433, 428

[56] References Cited

U.S. PATENT DOCUMENTS 4,974,258  11/1990  Arzounian et al. ..................... 379/437

Primary Examiner—Jack Chiang
Attorney, Agent, or Firm—Beveridge, DeGrandi, Weilacher & Young, LLP

[57] ABSTRACT

The present invention is related to a positioning structure of the upper cover of a telephone receiver, wherein the main design thereof is that the assembling portion of the receiver body is installed with a radial elastic piece, an axial elastic piece and a guiding rib; while a stopping portion is formed on the side of the free end of the radial elastic piece, while a positioning rib, a nose portion, and a screw rib are installed on the upper cover with respective to the radial elastic piece, axial elastic piece and guiding rib. According to said structure, the positioning rib may enter into the range of the stopping portion, and the nose portion is positioned that the stopping portion on one side of the axial elastic piece and the screw rib is entered into the range of the guiding rib. Therefore, the upper cover may be assembled on the predetermined position of the receiver body, and it may be open again by applying a force which is larger than a rated force.

8 Claims, 4 Drawing Sheets

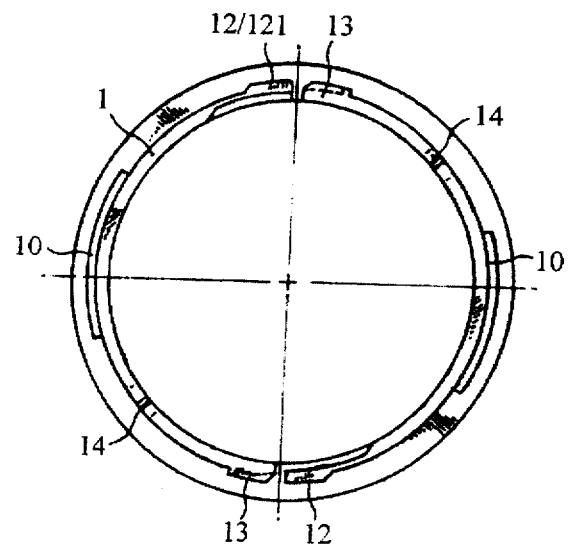
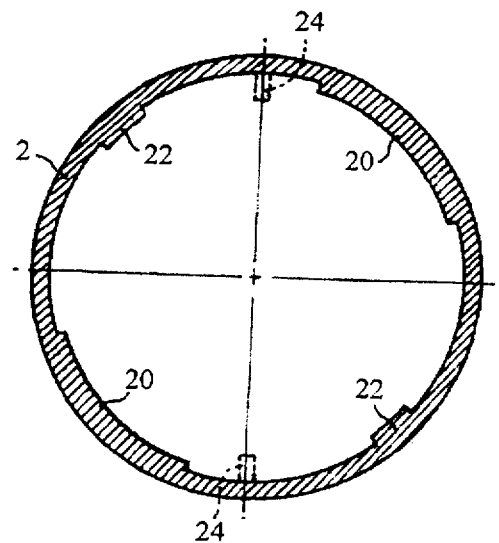
Fig. 2A
Fig. 2B
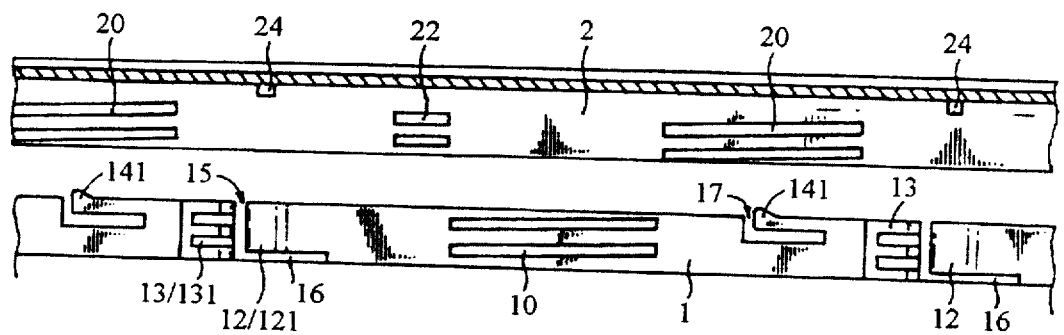
Fig. 3

POSITIONING STRUCTURE OF THE UPPER COVER OF A TELEPHONE RECEIVER

BACKGROUND OF THE INVENTION

1. Field of the Invention

The present invention relates to a positioning structure of the upper cover of telephone receiver, especially, to a receiver of a public telephone so that the upper cover thereof may be assembled on the receiver body quickly, and it may be pulled out with a force which is larger than a rated force.

2. Description of the Prior Art

In the prior telephone receiver, the two sides thereof are generally installed with microphone and trumpet, and an upper cover is screwedly engaged on the assembling portion of the receiver body, and an upper cover is screwedly engaged on the receiver body, wherein the upper cover will cause that the microphone and the trumpet is included within the receiver body in order to protect the microphone and the trumpet.

In order to avoid that the upper cover is destroyed manually so that the microphone and the trumpet therewithin are also destroyed. Therefore, when the upper cover is screwedly fixed on a predetermined position of the receiver body, conventionally, the screwed portion is fixed by adhersive or other high frequency method.

Although the adhersive or high frequency method may make sure that the upper cover will not been opened by an external force. However, if said microphone or trumpet are destroyed by accident, then it is needed to destroy the upper cover or the receiver body for repairing or updating the microphone and the trumpet.

SUMMARY OF THE INVENTION

Accordingly, the present invention has provided a positioning structure of the upper cover of telephone receiver, wherein the main design thereof is that the assembling portion of the receiver body is installed with a radial elastic piece, an axial elastic piece and a guiding rib; while a stopping portion is formed on the side of the free end of the radial elastic piece, and a positioning rib, a nose portion, and a screw rib are installed on the upper cover with respective to the radial elastic piece, axial elastic piece and guiding rib.

According to said structure, the positioning rib may enter into the range of the stopping portion, and the nose portion is positioned that the stopping portion on one side of the axial elastic piece and the screw rib is entered into the range of the guiding rib. Therefore, the upper cover may be assembled on the predetermined position of the receiver body, and it may be open again by applying a force which is larger than a rated force.

Further, for the upper cover having been assembled on a predetermined position of said upper cover, if a rotating torque which is larger than a rated force is applied, the upper cover will release form the confinement of the radial elastic piece and the axial elastic piece, thus it is opened by using a non-destroyed way and the microphone and the trumpet may be repaired or updated.

The present invention will be better understood and its numerous objects and advantages will become apparent to those skilled in the art by referencing to the following drawings in which:

BRIEF DESCRIPTION OF THE DRAWINGS

FIG. 2A is a schematic view of the assembling portion in FIG. 1;

FIG. 2B is a cross-sectional view of the upper cover in FIG. 1.

FIG. 3 is an expanding view of the assembling portion and the upper cover of FIG. 1;

DETAILED DESCRIPTION OF THE PREFERRED EMBODIMENT

Figure 1:
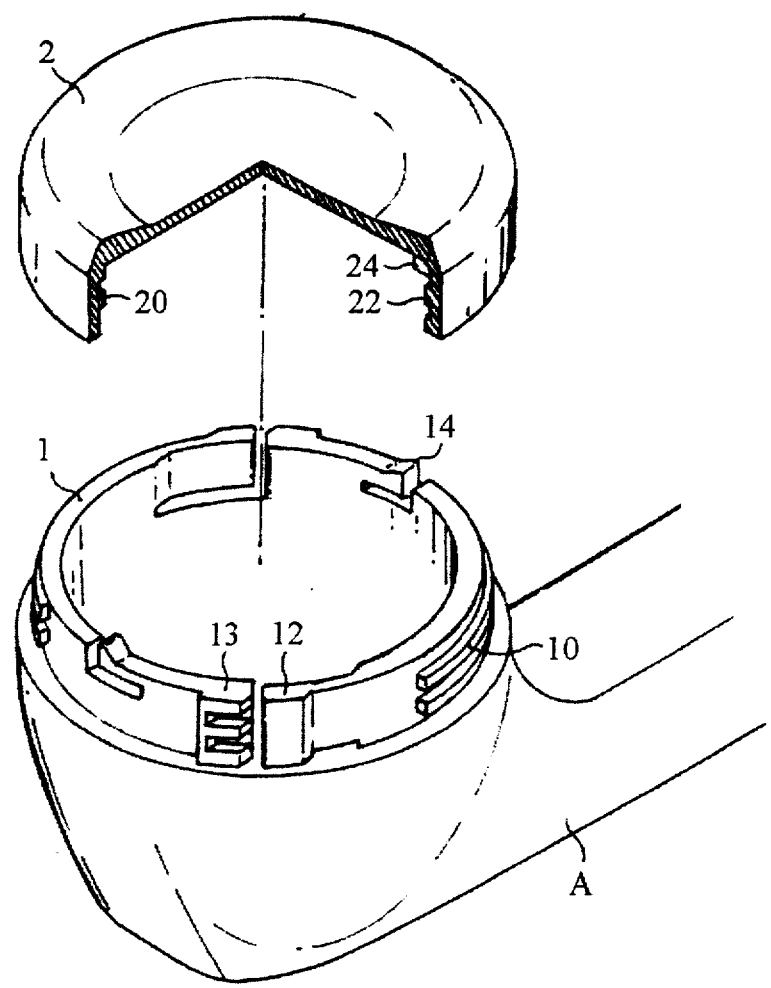
FIG. 1 is a perspective view of the present invention.

Now referring to FIGS. 1, 2 and 3, it is shown that the telephone receiver includes a receiver body (A) and an upper cover (2), and a cylindrical assembling portion (1) which is assembled with the cover (2) is formed on the upper surface of the receiver body (A).

A longitudinal suture (15) is formed on the wall surface of the cylindrical assembling portion (1) of the receiver body (A), while on the two sides of the longitudinal suture (15) are formed, respectively, a radial elastic piece (12) and a stopping portion (13); wherein the radial elastic piece (12) is formed according to a transversal suture (16) sequentially connected with said longitudinal suture (15), thus the free end thereof is elastic and the elasticity the elastic force thereof is determined according to the transversal suture (16) and a thicker plate thereof.

A concave portion (121) projected on the outer rim of the assembling portion (1) is formed on the free end of the radial elastic piece (12).

Further, a concave block (121) projected from the outer rim of the assembling portion (1) is formed on said stopping portion (13) and a plurality of transversal guiding groove (131) with proper length are formed thereon, the guiding groove (131) with respective to the direction of the radial elastic piece (12) has an opening type.

Further, an axial elastic piece (14) is formed on the upper surface of the assembling portion (1) according to another suture (17), and an upward convex block (141) is formed on the free end of the axial elastic piece (14). In this invention, the convex (141) is projected from the upper end of the assembling portion (1).

Moreover, a plurality of guiding rib having the same function of threads are formed on the wall surface of outer peripheral of the assembling portion (1).

Said radial elastic piece (12), axial elastic piece (14) and guiding rib (10) are arranged on the wall of the assembling portion (1) according to the predetermined orientations.

Another, a positioning rib (22), a nose portion (24) and a screw rib (20) are arranged within the peripheral wall of said upper cover (2) with respective to the radial elastic piece (12), axial elastic piece(14) and guiding rib (10).

The length of positioning rib (22) is equal to the distance between the end portion of the radial elastic piece (12) and the closed end of the guiding groove (131), and the horizontal height of the positioning rib (22) is corresponding to said guiding groove (131) of the stopping portion, while said nose portion (24) is longitudinally extended downwards to a position near the upper end surface of the assembling portion (1).

According to said structure, as the upper cover (2) is positioned on the assembling portion (1), since the radial elastic piece (12), axial elastic piece (14) and guiding rib (10) are alternatively arranged with the positioning rib (22), nose portion (24) and screw rib (20), thus the lower end surface is contacted with the lower end surface of the upper cover (2).

Figure 4:
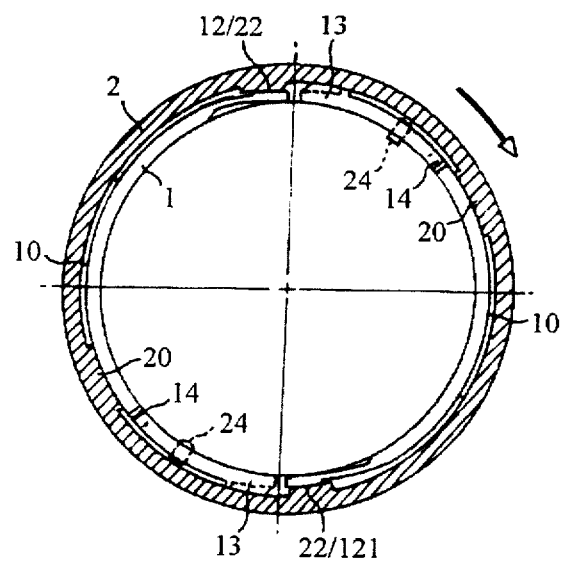
FIG. 4 is a schematic view shown that the radial elastic piece of the assembling portion is compressed by the positioning rib of the upper cover.

Next, the operator rotates the upper cover (2) by applying force according to the setting function (in this embodiment, the rotation direction is clockwise), then said screw rib (20) is started into the range of the guiding rib (10). As consequence, the front end of said positioning rib (22) will contact with the convex block (121) of the radial elastic piece (12), so that the free end of the radial elastic piece (12) is pressed so to compresse inwards. As shown in FIG. 4, said positioning rib (22) will pass through the range of said radial elastic piece (12).

Figure 6:
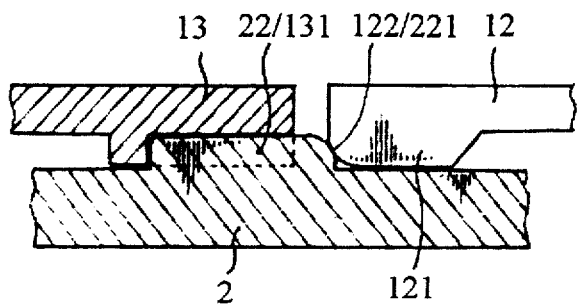
FIG. 6 is an enlarged schematic view shown that the positioning rib of the upper cover has entered into the locking position of the stopping portion.
Figure 5:
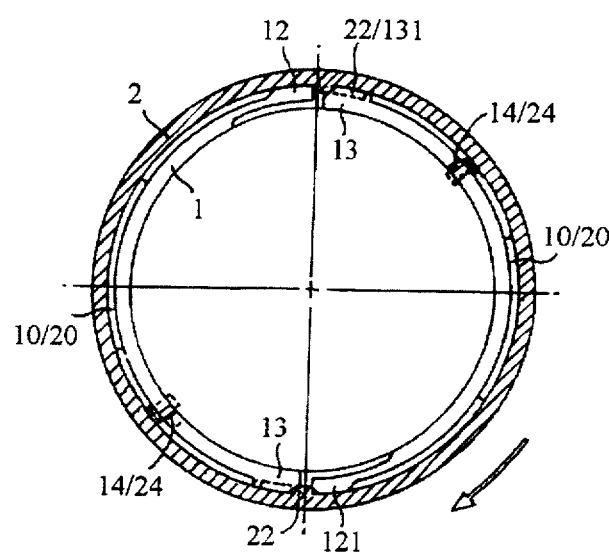
FIG. 5 is a schematic view shown that the positioning rib of the upper cover is rotated to a predetermined position of the assembling portion.

As the tail portion of the positioning rib (22) has passed through the end portion of said radial elastic piece (12), as shown in FIGS. 5 and 6, thus the pressure of the positioning rib (22) with respective to the radial elastic piece (12) will disappear so that the radial elastic piece (12) will restore to the initial condition according to the elastic force of the material itself. Now said positioning rib (22) will not reversibly rotate by the confinement of the radial elastic piece (12).

Since the length of positioning rib (22) is equal to the distance between the end portion of the radial elastic piece (12) and the closed end of the guiding groove (131) of the stopping portion. As the radial elastic piece (12) is resilient, meanwhile said positioning rib (22) will enter into the range of the guiding groove (131), therefore, said positioning rib (22) will not rotate continuously by the confinement of the closed end of the guiding groove (131) of said positioning rib (22), i.e., the position is positioned by the combination of the upper cover (2) and the assembling portion (1).

In the combination point of said upper cover (2), the positioning rib (22) of the upper cover (2) is on the horizontal guiding groove (131) of said stopping portion (13), simultaneously, the screw rib (20) will enter into the range of the guiding groove (10), since the upper cover (2) is confined axially by confining. In order to assure the axial positioning effect of said guiding groove (131) and said guiding rib (10) with respective to the upper cover (2), wherein said guiding groove (131) and said guiding rib (10) are uniformly arranged on the peripheral wall of the assembling portion (1) with four equal angles.

According to said structure, said guiding rib (10) is alternatively arranged with the screw rib (20) of the upper cover (2). Therefore, as the upper cover (2) is arranged on the assembling portion (1), the lower end surface of the upper cover (2) is contacted with the interface of the lower end of the assembling portion (1). However, if the screw rib (20) is engaged with said guiding rib (10) by screwing, then said positioning rib (22) and the guiding groove (131) of the stopping portion is needed to has the same slope as said screw rib (20) and the guiding rib (10), so that the positioning rib (22) may easily enter into the range of the guiding groove (131).

Further, for the upper cover (2) assembling on a predetermined position, the end portion (122) of the radial elastic piece (12) has a round corner with respective to the tail (221) of the positioning rib. If a reversing rotating torque is applied on the rated range of the upper cover, then the positioning rib (22) will compress the radial elastic piece (12) to compress so to be release from the confining of the radial elastic piece (12), thus the upper cover may be opened by a non-destroyed way. Therefore, the microphone and trumpet may be repaired or updated.

Said torque for opening the upper cover (2) is determined according to the arc of the end portion of radial elastic piece (122) and the tail portion (221) of positioning rib, while it is generally set at a value by which the operator would not open the upper cover, i.e. the user could only open the upper cover (2) safely by special tools.

Figure 8:
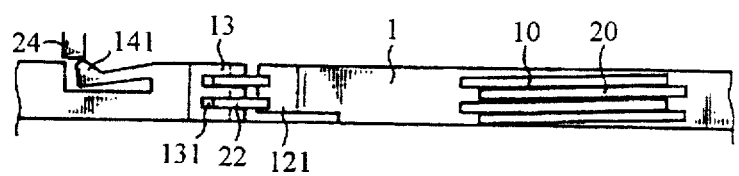
FIG. 8 is an expanding schematic view shown that the axial elastic piece of the assembling portion is pressed by the nose portion of the upper cover.

In said axial elastic piece (14), as the upper cover (2) is rotated to a position that the nose portion (24) will contact with the axial elastic piece (14), the axial elastic piece (14) will be compressed to move downwards, as shown in FIG. 8, so that the nose portion (24) is passed through the axial elastic piece (14).

As the upper cover (2) is rotated until the nose portion (24) is contacted with and compressed the axial elastic piece (14), it will suffer an upward reciprocal force, however, thereby, the positioning rib (22) and the screw rib (2) of the upper cover have enter into the range of the guiding rib (10) and the guiding groove (131), therefore, the upper cover (2) may retain in the same horizontal position, and the axial elastic piece will be compressed to bend downwards.

Figure 9:
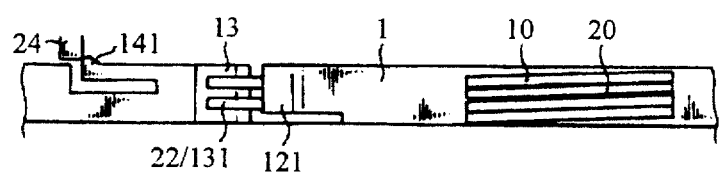
FIG. 9 is an expanding schematic view shown that the nose portion of the upper cover of FIG. 5 is moved to one side of the axial elastic piece.

After the nose portion (24) has passed through the axial elastic piece (14), as shown in FIG. 9, the compressing force of the axial elastic piece (14) applied by said nose portion (24) will disappear, thus the axial elastic piece (14) will restore to the initial condition by the elasticity of the material itself. Now the nose portion (24) will not rotate reversibly by the limitation of the axial elastic piece (14).

The time and position for said nose portion (24) to pass through the axial elastic piece (14) is the same as that for the positioning rib (22) to pass through the axial elastic piece (14), therefore, after the upper cover (2) has assembled in the predetermined position, meanwhile, the radial elastic piece (12) and the axial elastic piece (14) will be confined to rotate reversibly.

Figure 7:
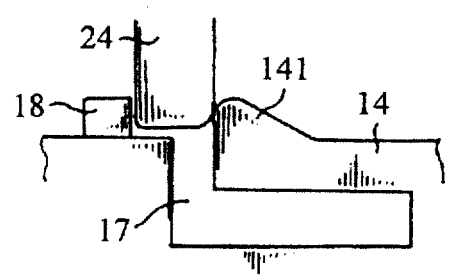
FIG. 7 is an enlarged schematic view shown that the nose portion of the upper cover is located on the locking position of the axial elastic piece.

Moreover, the contacting position between the axial elastic piece (14) the nose portion (24) is formed as a round corner, as shown in FIG. 7, thus the rated torque for reversibly rotating the upper cover (2) is the sum of the torque's of the radial elastic piece (12) and the axial elastic piece (14).

According to said structure, the radial elastic piece (12) and axial elastic piece (14) may be arranged on the wall of the assembling portion (1), simultaneously. However, the radial elastic piece (12) or the axial elastic piece (14) may be used independently according to the practical requirement, then the upper cover will also retain the predicted functions.

In the case that the axial elastic piece (14) is used independently, in order to that the upper cover (2) has the same function of the stopping portion (13) in the predetermined assembling point, thus a projecting portion (18) is extended upwards from the upper end surface of the assembling portion (1), and the distance between the side of the projecting portion (18) and the axial elastic piece (14) is equal to the width of the nose portion (24). Therefore, after the nose portion (24) has passed through the axial elastic piece (14), as shown in FIG. 7, said nose portion (24) will enter into a place between the projection portion (18) and the axial elastic piece (14) and it is confined to rotate forwards or backwards.

Figure 10:
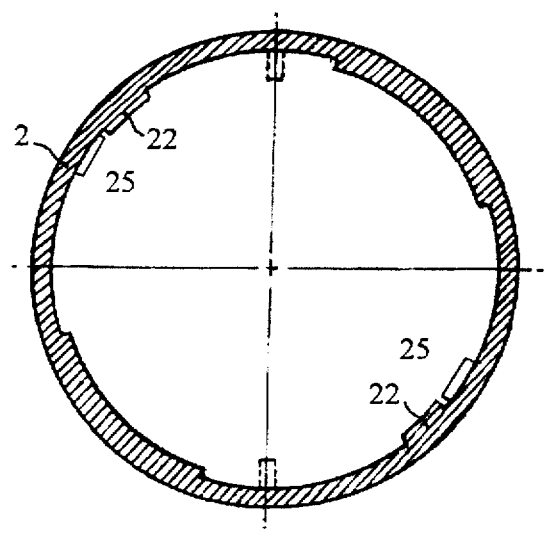
FIG. 10 is a modified embodiment of the upper cover, wherein one side of the positioning rib is installed with an auxiliary rib.
Figure 11:
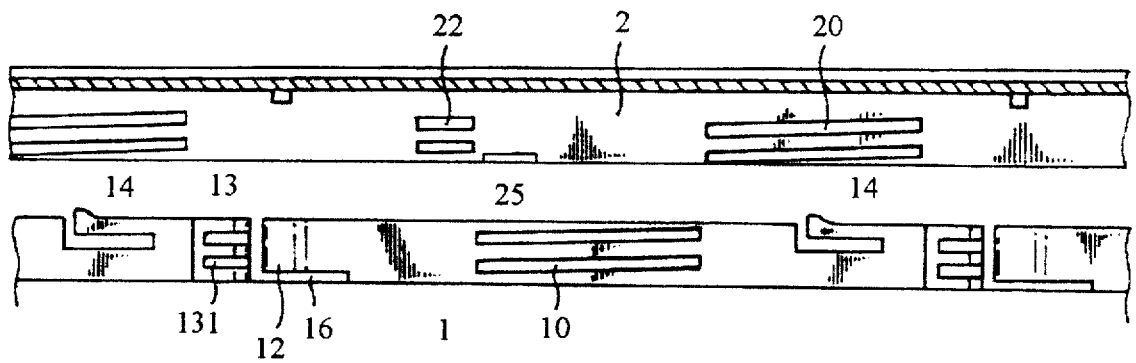
FIG. 11 is an expanding view of the assembling portion of upper cover in FIG. 10.
Figure 12:
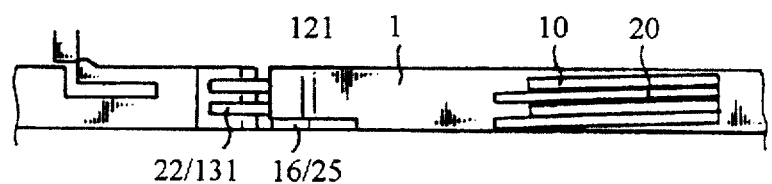
FIG. 12 is a schematic view shown that the auxiliary rib is moved to the position of the radial elastic piece.

Said arrangement of said stopping portion guiding groove (131) and the positioning rib (22) of the upper cover is used to prevent the axially pulling force. In order to further increase said effect, in the modified embodiment of the present invention, an auxiliary rib (25) is installed on one side of said positioning rib (22) of the upper cover, as shown in FIGS. 10 and 11, wherein the level of the auxiliary rib (25) is corresponding to the suture (16) of the radial elastic piece (12). As the upper cover (2) is assembled on a locking position of said assembling portion (1), the auxiliary rib (25) is below the radial elastic piece (12), as shown in FIG. 12, thus the auxiliary rib (25) will provide an axially supporting force to said upper cover (2).

Although certain preferred embodiment of the present invention has been shown and described in detail, it should be understood that various changes and modification may be made therein without departing from the scope of the appended claims.

What is claimed is:

1. A positioning structure of the upper cover of a telephone receiver mainly including a receiver body having a assembling portion and an upper cover of the assembling portion, characterized in that:

(A) the wall of said assembling portion is comprised of:
   an radial elastic piece on the free end of which a convex block projected from the periphery of the assembling portion is formed;
   a stopping portion which is on the side of the radial elastic piece and is projected from the outer rim of the assembling portion, and a plurality of transversal guiding groove with proper length being formed thereon, while the guiding groove with respective to the direction of the radial elastic piece having an opening type;
   a guiding rib being arranged on the peripheral wall of the assembling portion;

(B) the upper cover is comprised of:
   a positioning rib which is corresponding to said radial elastic piece, the length of positioning rib being equal to the distance between the end portion of the radial elastic piece and the closed end of the guiding groove, and the level of the positioning rib being corresponding to said guiding groove of the stopping portion;
   a nose portion which is longitudinally extended downwards to a position near the upper end surface of the assembling portion;
   a screw rib which is corresponding to the guiding rib of the assembling portion.

2. The positioning structure of the upper cover of a telephone receiver as recited in claim 1, wherein the stopping portion and the radial elastic piece are all arranged uniformly on the peripheral wall of the assembling portion with approximately equal angles.

3. The positioning structure of the upper cover of a telephone receiver as recited in claim 1, wherein the level of the positioning rib is corresponding to that of the guiding groove of stopping portion.

4. The positioning structure of the upper cover of a telephone receiver as recited in claim 1, wherein the slope of the thread of the positioning rib and the stopping portion guiding groove are equal to that of the screw rib and the guiding rib.

5. The positioning structure of the upper cover of a telephone receiver as recited in claim 1, wherein the end portion of the radial elastic piece with respective to the tail of the positioning rib is formed as a round angle.

6. The positioning structure of the upper cover of a telephone receiver as recited in claim 1, wherein a auxiliary rib with respective radial elastic piece is installed on one side of the upper cover positioning rib, the level of the auxiliary rib is corresponding to that of the suture (16).

7. A positioning structure of the upper cover of a telephone receiver mainly including a receiver body having a assembling portion and an upper cover of the assembling portion, characterized in that:

(A) the wall of said assembling portion is comprised of:
   an axial elastic piece on the free end of which an convex block projected from the upper end surface of the assembling portion being formed;
   a projecting portion which is extending upwards form the upper end surface of the assembling portion, and the distance between the side of the projecting portion and the axial elastic piece is equal to the width of a nose portion;

(B) the upper cover is comprised of:
   a nose portion which is longitudinally extended downwards to a position near the upper end surface of the assembling portion;
   a screw rib which is corresponding to a guiding rib of the assembling portion.

8. The positioning structure of the upper cover of a telephone receiver as recited in claim 7, wherein the end portion of the axial elastic piece with respective to the nose portion is formed as a round angle.

* * * * *